Patented Feb. 9, 1932

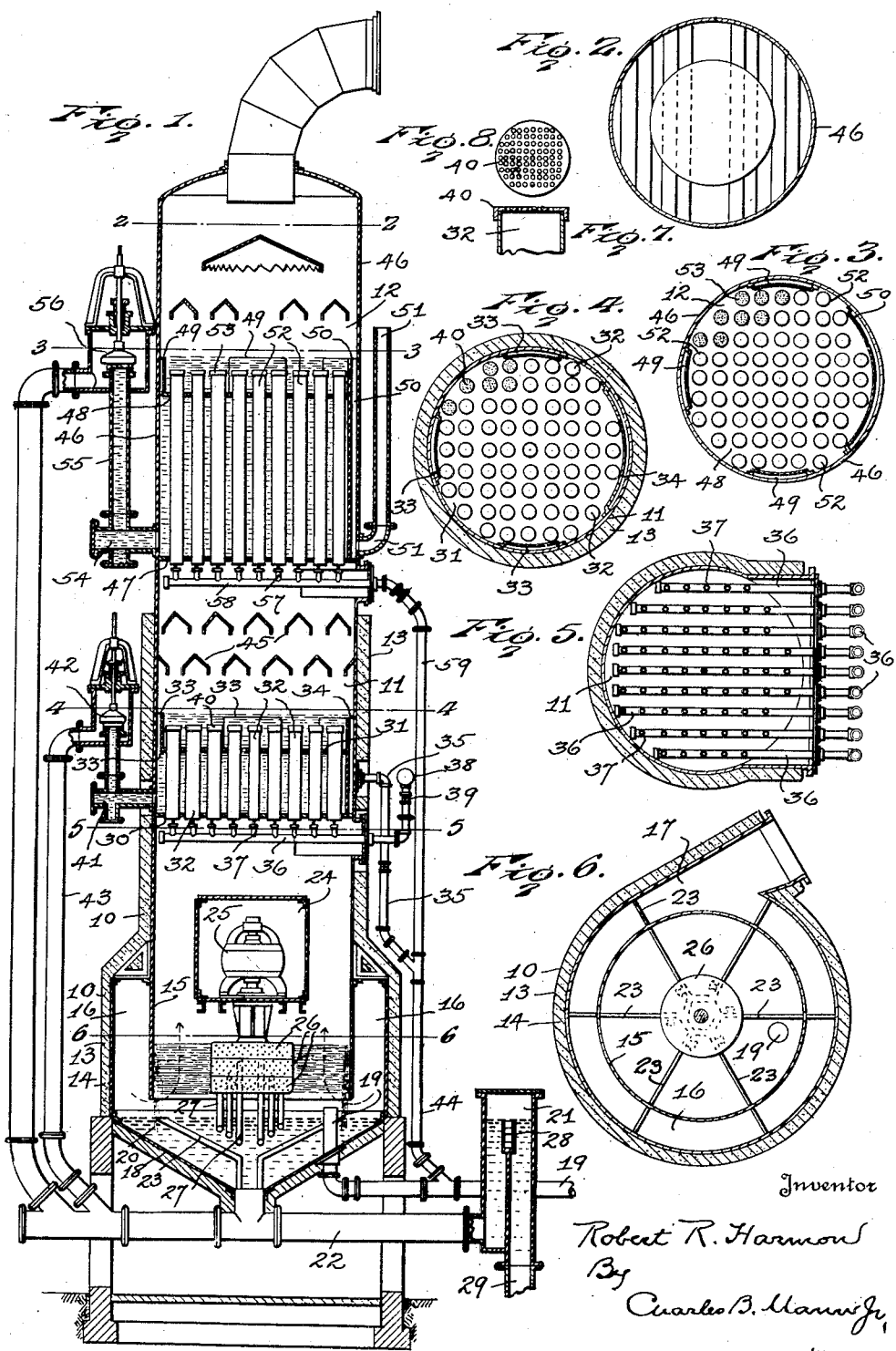
Feb. 9, 1932.  R. R. HARMON  1,844,849
PROCESS FOR CLEANING GAS
Filed Feb. 27, 1929

1,844,849

UNITED STATES PATENT OFFICE

ROBERT R. HARMON, OF BALTIMORE, MARYLAND, ASSIGNOR TO PEABODY ENGINEERING CORPORATION, OF NEW YORK, N. Y., A CORPORATION OF NEW YORK

PROCESS FOR CLEANING GAS

Application filed February 27, 1929. Serial No. 343,031.

This invention relates to an improved process for cleaning gas.

Complete cleaning of blast-furnace gas requires the removal of suspended particles of ore dust, coke breeze, silica and alumina which exist in sizes varying from colloids upward to particles the size of a pin head. Added to these constituents, as dust, are condensed alkali substances which have previously been volatilized in the furnace and these latter substances, which are also mixed with traces of lead, zinc, arsenic, etc., are commonly known as metallurgical smoke.

In view of the disperse nature of these colloidal substances their complete removal becomes a matter of energy input requirements, and to eliminate them by means of mechanical energy, requires the contact of each separate particle with a force sufficient for its precipitation, by agglomerating with other particles or by causing it to adhere to some wet surface or to become coated with a liquid film.

To actually accomplish this requires that the entire gas volume be broken up into approximately as many sub-divisions as there are particles present to be captured, since each particle is enveloped in a sphere of gaseous medium. This theory is strengthened by an analysis of the cleaning curves for any mechanical device working with water as a liquid medium and attempting to disintegrate the gas or gas and water. The decrease in concentration of suspended dust particles with each successive contact between the gas and liquid occurs rapidly with the first several units, but the removal efficiency falls off as the curve approaches the limiting concentration (zero) of the dust remaining in the gas.

Since I have come to consider the removal of colloidal dust particles from a gaseous medium, or, in more scientific language, the destruction of a disperse system, as a function of certain definite energy requirements, I am able to point out certain potentials within the gas itself which, if properly utilized, will effect this destruction with but little expenditure of energy from an outside source.

Blast-furnace gas, besides being dust and fume laden, is also hot and laden with water vapor, the gas normally containing 15 to 25 per cent, by volume, in the raw state.

I have discovered that the mechanics of the dust removal process as universally practiced, is wrong, particularly in the following respects:

(1) Cleaning and cooling, as heretofore practiced, are intimately tied together in the same unit and the accomplishment of the one, viz., cooling, is effected at the expense of the other.

(2) Cleaning and cooling are effected by the injection of cold water spray into the gas stream. Because of this, superheat of the gas is lost through rapid chilling before the compensating temperature is reached. In other words, the compensating temperature is a point of theoretical maximum saturation of the gas in which all superheat is utilized to vaporize water. This is attained only by conducting the cooling process in stages, and not by shock cooling as heretofore conducted.

(3) Even though the compensating temperature were actually realized and all superheat made available for vaporizing water, resulting condensation in the cooling stage will not permit of maximum dust removal, because, the injection of the cooling water as spray, produces water nuclei upon which condensation will take place in preference to dust nuclei. Condensation will always take place on the larger of two nuclei, and since the drop formed by the water spray is much larger than the dust particle, the former is selected.

My invention therefore has among its objects to provide an improved process wherein the thermal energy in the gas will be retained in the raw gas while depleting the gas of dust; to use all superheat in the gas as latent heat of vaporization to form a saturated gas whose dew point will be above that of the normal gas through intimate contact with hot water; to strip out or remove the greater portion of the dust originally in the gas by intimate contact with hot water, either in the form of spray or bubbles, keeping the gas at its compensating temperature; to cool the gas by surface cooling, preferably, but in the absence of water sprays and droplets formed by such sprays, to force the normal water vapor in the gas to condense upon the dust nuclei to effect the removal of the latter and eliminate the dust particles held in the water entrainment by liquid filtration, that is, by bubble washing of droplets that have been formed by condensation about the dust particles.

With these, and other objects in view, a form of apparatus for carrying out this process is illustrated in the accompanying drawings, wherein,—

Fig. 1 shows in vertical sectional elevation, one form of apparatus for carrying out the invention.

Fig. 2 illustrates a cross-sectional detail through the same,—the section being taken on the line 2—2 of Fig. 1.

Fig. 3 shows another cross-sectional detail through the apparatus as viewed on the line 3—3 of Fig. 1.

Fig. 4 illustrates a cross-sectional detail,—the section being taken on the line 4—4 of Fig. 1.

Fig. 5 shows another cross-sectional detail through the apparatus,—the same being taken on the line 5—5 of Fig. 1.

Fig. 6 illustrates a cross-sectional detail on the line 6—6 of Fig. 1.

Fig. 7 shows a sectional detail of one of the tube-heads, and

Fig. 8 illustrates the same in top view.

Referring to the drawings, the apparatus in the form disclosed for carrying out the process, is of the tower type, having in this instance, a lower or stripper zone 10 in which the grosser nuclei are removed; an intermediate humidifying and diffusing or mixing zone 11 and an upper condensing zone 12 for the removal of lesser nuclei and colloidally condensed water.

The lower and intermediate zones are formed within an insulated shell structure 13 which latter, around its base is enlarged at 14.

On the interior of the lower zone of the shell there is a depending annular shell-portion 15 between which and the enlarged portion 14, an annular internal passage 16 is formed.

A tangential passage 17, shown in Fig. 6, is provided in the lower zone portion through which the raw gas to be cleaned passes into the annular passage 13 and, through centrifugal force, any heavy particles of dust may be thrown out.

Beneath the annular passage 16 and the depending annular shell portion 15, there is an inverted cone bottom 18, into which a pipe 19 extends, which pipe conveys hot clear water 20, from a clarifier,—the hot clear water in the cone-bottom being maintained at a uniform level by means of a trap-structure 21 which is connected to the center of the cone-bottom by means of a conduit 22.

In this instance, the level of the hot water in the cone-bottom 18 is slightly below the lower edge of the annular depending shell 15.

I provide a series of up-standing ribs or flanges 23 on the upper side of the cone-bottom for a purpose that will presently be explained.

A motor tunnel 24 is provided in the lower or stripper zone portion 10 of the apparatus, and a motor 25 is located therein. The shaft of the motor depends into the center of the annular shell 15 and carries a series of annular sprayers 26,—the sprayers in this instance, consisting of three annular compartments separated by horizontal plates but having annular or circumferential perforated plates through which hot water may be thrown by centrifugal action.

The bottom of each sprayer compartment has a series of depending tubes 27,—the tubes from the intermediate compartment extending through the lower compartment and the bottom of the latter and the tubes from the upper compartment extending down through the compartments beneath it and below the lowermost compartment.

It will be noted that the tubes vary in length so that they will not all terminate at their lower ends in the same horizontal plane, and it will further be noted that the lower ends of the tubes have elbow ends and that all of them dip into the hot water in the cone-bottom 18.

It will be obvious that when the motor revolves the several sprayers 26, the depending tubes will travel in a circular path through the hot water and will therefore scoop up the water and convey it to the several sprayer compartments above from which it will be thrown laterally, by centrifugal force, from the perforated circumferential plates of the compartments across the interior of the shell 15 and against the annular wall of the latter.

The purpose of the up-standing ribs or flanges 23 on the upper side of the cone-bottom is to prevent swirling of the hot water as the depending tubes 27 travel in a circular path therethrough.

It will thus be noted that the water thus sprayed laterally in the lower stripper zone is hot and as the hot gas passes under the lower edge of the shell 15, it must first pass through the stream of hot water flowing down the wall of the shell and then up through the spray of hot water extending laterally across the interior of the shell.

While I have shown one form of spraying mechanism, it is to be understood that the present invention is not to be limited to this form, for the real idea involved at this point is to subject the hot gas to the action of a spray of hot water whereby to keep the temperature of the gas up and not cool the hot gas by bringing it into contact with water that will chill the gas at this stage; to act as a stripper for coarse nuclei, and further to serve as a shock absorber to prevent dust passing through with quick surges of gas.

The trap structure 21, has an adjusting device 28 in order to maintain a predetermined hot water level above the lower ends of the tubes 27, and the dust-laden water in the cone-bottom passes by conduit 22 to the trap and is conveyed from the latter by conduit 29 to a thickener or clarifier.

The hot gas next passes to the upper insulated portion of the shell structure into a zone which I term humidifying and diffusing or mixing zone 11.

In this zone 11, I provide horizontal lower and upper tube-sheets 30 and 31 respectively with a series of vertical diffusing tubes 32, whose lower ends extend through the lower tube-sheet 30 and whose upper ends project above said upper tube-sheet 31, forming a space for a heating agent, such as hot water, between the upper side of said upper tube-sheet and the upper ends of the diffusing tubes 32 for a purpose that will presently be explained.

The lower tube-sheet has a tight connection with the interior of the annular insulated shell 13, but a plurality of vertical passages 33, are provided around the periphery of the upper tube-sheet from the lower to the upper side thereof.

At one side of this zone 11, I provide a vertical wall forming a vertical passage 34 which extends from the lower tube-sheet 30 up through the hot water space and through the upper tube-sheet 31 to a point on a level with, or above, the upper ends of the vertical overflow passages 33.

This vertical wall and passage 34 is located at the inner side of the insulated shell-wall, and a hot water supply-pipe 35 enters the side of the shell and constantly supplies hot water to the water space between the lower and upper tube-sheets 30 and 31 and about the diffusing tubes 32 extending vertically therethrough and up through which the gas must pass.

In case the gas when entering the lower ends of the diffusing tubes 32 does not possess sufficient thermal energy, its thermal energy may be increased by means of steam or hot water, sprayed into the gas within the passages of the tubes.

In the present instance, I show a series of horizontal pipes 36 extending through the insulated shell from the exterior, each of which is capped at its inner end, and each of these pipes extends beneath the lower open ends of a row of vertical diffusing tubes 32 and has a nozzle 37 directly beneath each tube.

Steam will be fed to these pipes 36, from a header 38 and a valve 39, which is thermostatically controlled, controls the passage of steam through the pipes 36 and nozzles 37.

The up-flowing gas is therefore broken up into a series of streams by passing up through the tubes, and by then directing the steam from the nozzles into the tubes, a more intimate mingling of the steam or water vapor with the gas is attained in the short time of its passage through the tubes.

The upper end of each tube 32 is provided with a perforated head plate 40, (see Figs. 7 and 8) and the gas, steam and vapors are passed through these perforated plates in order that a thorough and additional mixing may be effected.

It will be noted that in the structure disclosed, the upper ends of the tubes 32 are submerged in hot water which is retained above the upper tube-sheet 31 as well as around the tubes between said upper plate and the lower tube-plate,—the level of hot water being maintained by means of an overflow pipe 41 and an adjustable trap 42.

From the perforated head plates at the upper ends of the tubes, the mixture of gases and vapors passes into and through the body of hot water maintained in and about the tubes to secure an ultimate diffusing and humidifying action.

The overflow water from trap 42, is carried off by pipe 43, into conduit 22 and passes to the thickener or clarifier, as does the dust laden water from the cone-bottom. The clarified hot water is then pumped through pipe 19 and branch pipes 44 and 35 and is again utilized.

To prevent entrained moisture from being carried with the gas issuing from the hot water in the humidifying and diffusing or mixing zone 11, I provide this zone with a series of impingement baffles 45, which are preferably arranged in staggered relation, and in a plurality of horizontal rows, about the level of the water.

The next stage in the process as carried on by the apparatus is what I term the condensing stage, where indirect cooling of the gas streams takes place and condensation occurs upon the remaining fine dust nuclei present, thus wetting and removing them.

In this condensing stage, I omit the insulation from around the annular shell portion 46 and provide lower and upper horizontal tube sheets 47 and 48 in said shell which sheets extend all the way across and have tight joint with the interior annular wall-surface of that shell.

A plurality of vertical passages 49 are formed on the interior of the shell from the lower to, and above, the upper side of the upper tube-sheet 48, and at one side there is provided a vertical water-supply passage 50 which extends from a point above the upper tube-sheet 48 down to the lower tube-sheet.

A cold water supply-pipe 51 enters the shell portion 46 and supplies cold water to the vertical passage 50.

A series of vertical tubes 52, extend up through the lower tube-sheet 47 and also through and above the upper tube-sheet 48, but terminate in a horizontal plane below the upper ends of the vertical passages 49 and 50. These vertical tubes each have a perforated cap 53 on the upper end, but the lower ends, beneath the lower tube-sheet 47, are wide open.

It will thus be understood that a water circulating chamber is formed in the shell between the tube-sheets 47 and 48 and that the tubes 52 extend through the cool water in this chamber.

An outlet pipe 54 extends from the bottom of the water-chamber and connects with a pipe 55 leading to an adjustable trap 56 at the side of the shell which trap controls the level of water on top of the upper tube-sheet 48.

The level of this water is maintained above the capped upper ends of the tubes 52 so that gas passing up through those tubes must bubble through the water over the upper outlet-ends of the tubes.

Cold water, therefore, from the vertical passage 50 flows over the perforated cap-ends of the tubes 52 above the upper tube-sheet 48, and then passes down through the passages 49 to the water chamber between the two tube-sheets where it circulates around the tubes and thus acts to cool the gas indirectly during its passage through the tubes, and condenses the water vapor in the gas on and about the fine dust particles and forms droplets, while the cooling water finally passes out through pipes 54 and 55 to and past the trap 56.

One of the important results is produced in this condensing stage, as carried on by my process, in that I effect an indirect cooling of the gas streams and in the absence of water sprays. I thereby avoid the formation of such droplets as are produced by water-sprays and compel the water vapor to condense directly on the dust nuclei itself and these condensation-coated dust particles are then readily carried off.

I, therefore, carry on my process in a disperse system wherein the dispersion medium is gaseous and the disperse phase is solid, (dust nuclei), and I remove the solid disperse phase from the dispersion medium by producing a vapor disperse phase in sufficient quantity to produce a degree of supersaturation and utilize the solid disperse phase (dust nuclei) as condensation nuclei so that droplets of condensation will form about the said solid condensation nuclei so as to be readily carried off.

In order to prevent water dripping through the perforated caps on the upper ends of the tubes 52, the velocity of the gas through the perforations is gauged so as to overcome any possible water-head over the perforated plates.

In this manner, as the gas passes up through the tubes 52, indirect cooling takes place and condensation occurs upon the remaining fine dust nuclei present, thus wetting and removing them. Aggregates of these tiny dust particles will also be collected by the tiny droplets of condensation on the interior gas passages of the tubes and these are either washed down the inside walls of the tubes by the water condensed out of the gas, or are picked up again by the gas stream, due to its velocity, and carried through the caps into the water above.

In order to prevent any deposition and building up of dust within the tubes 52, I provide spray heads 57 from a plurality of horizontal pipes 58, which extend to the outside of the shell and are connected to a pipe 59 through which hot water may be supplied periodically and projected into the tubes from the sprayheads to flush out the tubes.

In the process of condensation upon nuclei, infinitesimal in size, as treated here, the maximum degree of subdivision of water vapor is induced by the degree of subdivision of the nuclei, hence water droplets, formed by condensation about the dust particles, result, which approach the magnitude of grosser dust particles. It is therefore necessary to provide means for eliminating these droplet-encased dust-particles.

This is accomplished by passing the gas through the series of apertures at the upper ends of the tubes into the sheet of water and these tiny droplet-encased dust particles are readily merged into the body of water and their removal is thus completed.

Having described my invention, I claim,—

1. The process of cleaning gas consisting in breaking up the gas into streams, intimately mingling a heating agent with the streams of gas, passing the gas and the added heating agent through a body of hot water and cooling the gas in the absence of sprays to cause condensation of the vapor to take place on the dust-particles in the gas.

2. The process of cleaning gas consisting in breaking up the gas into streams, intimately mingling a heating agent with the streams of gas, passing the gas and the added heating agent through a body of hot water to secure a diffusing and humidifying action thereon, again dividing the gas into streams and cooling the latter streams of gas in the absence of sprays to cause condensation of the vapor therein to take place about the dust-particles in the gas.

3. The process of cleaning gas consisting in intimately mixing steam or water vapor with the stream of flowing gas, passing the gas with its vapor laden mixture through a body of hot water then causing the vapor in the gas to condense about the dust particles therein to produce dust centered droplets whereby the latter will form vehicles for the fine dust, and then forcing the gas containing the dust-centered droplets up through a body of water in which latter the dust-centered droplets will be left and the dust particles remain in suspension.

4. The process of cleaning dust-laden gases consisting of passing a continuous stream of gas through hot water to remove coarse dust and preserve the heat in the gas, cooling the gas in the absence of sprays to form droplets about the fine dust particles therein, presenting the stream of gas with its condensate-coated dust particles to a moving body of water through which the gas passes, leaving the condensate-coated dust particles in suspension in said water, carrying off the previously mentioned hot water and its suspended coarse dust particles, removing said dust particles from the hot water and returning the hot water for further use in removing and carrying off additional coarse dust particles and aiding in preserving the heat in the continuously flowing hot gas.

5. The process of cleaning dust-laden gases consisting of passing a continuous stream of gas through hot water to remove coarse dust while preserving the heat in the gas, condensing vapor in the gas stream on the finer dust particles remaining in that gas stream to form suspended droplets about those finer dust particles, passing the stream of gas with its suspended condensation-coated dust-particles through a moving body of water which flows across the path of the gas-stream, leaving said condensation-coated dust-particles in suspension in said moving body of water to be carried off from the path of the gas stream, carrying off the previously-mentioned hot water with its coarse dust particles, removing the coarse dust from said water and returning the clarified hot water for further use in removing additional coarse dust particles and aiding in preserving the heat in the continuously flowing hot gas.

In testimony whereof I affix my signature.

ROBERT R. HARMON.